Feb. 7, 1967  R. J. MARTIN  3,302,451
VISCOSITY INDEX MEASURING APPARATUS
Filed Oct. 27, 1964  4 Sheets-Sheet 1

INVENTOR.
ROBERT J. MARTIN

INVENTOR.
ROBERT J. MARTIN

INVENTOR.
ROBERT J. MARTIN 3,302,451
VISCOSITY INDEX MEASURING APPARATUS
Robert J. Martin, Springdale, Pa., assignor to Gulf Research & Development Company, Pittsburgh, Pa., a corporation of Delaware
Filed Oct. 27, 1964, Ser. No. 406,827
7 Claims. (Cl. 73—55)

This invention relates to a viscosity index indicator and in particular pertains to apparatus for automatically indicating the viscosity index of lubricating oils.

It is well known that lubricating oils exhibit a different viscosity at different temperatures, the viscosity usually decreasing rapidly with increase in temperature. One measure of this change in viscosity with temperature is called the viscosity index. The viscosity index, or V.I., is an empirical number that indicates the effect of temperature on the viscosity of an oil. A low V.I. signifies a relatively large change of viscosity with temperature. Accordingly, an oil whose viscosity is least affected by temperature changes has a high V.I. The V.I. number has been defined by the American Society for Testing Materials in A.S.T.M. Designation D567-53 as follows:

$$V.I. = \frac{L-U}{L-H} \times 100$$

$$= \frac{L-H}{D} \times 100$$

where:

$U$ = viscosity at 100° F. of the oil in question,
$L$ = viscosity at 100° F. of an oil of zero V.I. having the same viscosity at 210° F. as the oil in question,
$H$ = viscosity at 100° F. of an oil of 100 V.I. having the same viscosity at 210° F. as the oil in question, and
$D = L - H$.

It is apparent from the above more or less arbitrary definition of V.I. that its determination for any particular oil depends on measurement of viscosity of the oil at two temperatures, namely 100° F. and 210° F., and from these two measured viscosities the V.I. of the oil can be computed. The properties L and D of the hypothetical oil having the same viscosity at 210° F. as the oil in question are known and have been tabulated by A.S.T.M. for various viscosities, as in A.S.T.M. Designation 567-53 Standard Method for Calculating Viscosity Index and in A.S.T.M. Special Technical Publication No. 43A both of which publications are obtainable from American Society for Testing Materials, 1916 Race Street, Philadelphia 3, Pa., U.S.A., and are incorporated in this specification by reference. Thus by measuring the viscosity of the oil in question at 100° F. one obtains U directly, and by measuring the viscosity of the oil in question at 210° F. one obtains L and D (or H) from the A.S.T.M. table. The V.I. for the oil in question can then be computed from the definition:

$$V.I. = \frac{L-U}{D} + 100$$

It is evident that the process of measuring the viscosities, looking up values in a table, and making the defined computation is time-consuming and not well adapted to automatic control purposes. In the continuous blending of lubricating stocks it is highly desirable to automatically monitor the V.I. of the components, and also the V.I. of the resulting blend, and to automatically control the blending operation in response to the observed V.I. This requires an automatic viscosity index indicator such as is provided by this invention.

Accordingly, it is an object of this invention to provide an automatic viscosity index indicator.

It is a further object of this invention to provide apparatus that produces an output signal whose magnitude is a measure of the V.I. of an oil so that the V.I. signal can be employed for process-control purposes.

It is a still further object of this invention to provide an automatic, continuously operating apparatus whose output signal is a measure of the V.I. of an oil flowing therethrough.

These and other useful objects of this invention are attained by the apparatus described in this specifiication of which the drawings form a part, and in which FIGURE 1 is a graph of viscosity against temperature that is helpful in understanding the invention;

In this invention the oil sample whose V.I. is to be determined is passed through two viscometers which are respectively held at temperatures of 100° F. and 210° F. The viscometers are of a type that produces in each case an electrical signal that is proportional to the measured viscosity. The invention further comprises a linear electrical analog computer that derives from a signal representing the viscosity of the sample at 210° F., the values of L and D of the hypothetical oils having this viscosity at 210° F. The signals thus representing L and D are then combined in the analog computer with the signal representing the viscosity of the sample at 100° F. to produce an output signal that is indicative of the V.I. of the sample. The output signal is recorded in conventional manner or may be employed for appropriate process-control purposes.

Figure 1:
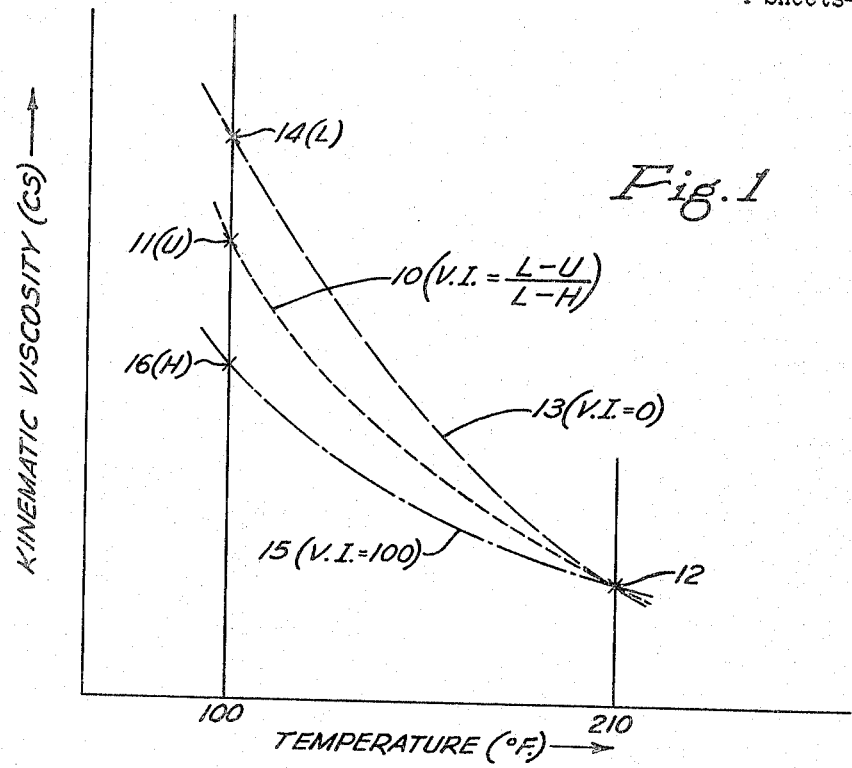

Referring first to FIGURE 1, which is a graph of viscosity against temperature, there is shown in curve 10 the variation of viscosity with the temperature of a typical oil sample whose V.I. is to be determined. The observed viscosity at 100° F. is indicated by point 11, and the observed viscosity at 210° F. is indicated by point 12. The viscosity at point 11 represents the quantity U in the definition of V.I. From the A.S.T.M. tables one finds the value L representing the viscosity at 100° F. of a hypothetical oil of zero V.I. having the same viscosity at 210° F. as the oil whose V.I. is to be determined. Thus starting from point 12, a zero V.I. oil would give the curve 13 which at 100° F. passes through the point 14, it being apparent that an oil of zero V.I. would have a steeper variation of viscosity with temperature than the typical oil represented by curve 10. It is, of course, not necessary to actually observe curve 13, its crossing of the 100° abscissa point 14 being read as L from the A.S.T.M. table. Similarly starting from point 12, a 100 V.I. oil would give the curve 15 which at 100° F. passes through the point 16, it being apparent that an oil of 100 V.I. would have a less steep variation of viscosity with temperature than that of curve 13. Again it is not necessary to actually observe curve 15, its crossing of the 100° abscissa point 16 being obtained if desired from the A.S.T.M. table. The viscosity interval between H and L is the quantity D. Usually H is not explicitly tabulated, but it is easily obtained if desired from $D=L-H$, the quantity D being given in the A.S.T.M. tables. Since U, L, H, and D are thus known, it is possible to compute from the above-stated definition the V.I. number for the oil in question whose variation of viscosity with temperature is represented by curve 10. (Note that for a different oil sample the new point 12 may be higher or lower and in order to compute the new V.I. new hypothetical curves 13 and 15 are involved whose points of crossing the 100° F. abscissa are obtained as read from the A.S.T.M. tables.) It is also apparent that since the curve 15 for the hypothetical 100 V.I. oil is an arbitrary one set up by the A.S.T.M., it is possible that the point 11 may for a very high-grade oil fall below point 16, thus giving a V.I. number larger than 100. Modern high-grade lubricating oils commonly have a V.I. that is over 100.

Figure 2:
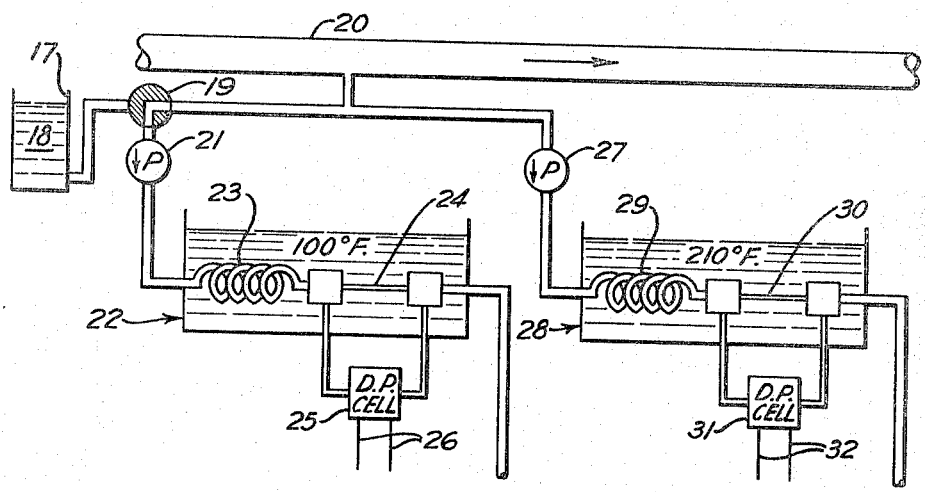
FIGURE 2 is a schematic diagram of the viscometers employed in this invention.

Referring now to FIGURE 2, there is shown a source 20 of sample whose V.I. is to be determined. The sample may, for example, be withdrawn from a process stream 20 and is divided into two portions. A positive-displacement pump 21 continuously pumps part of the sample at a constant volumetric rate through a viscometer schematically indicated by 22. A second positive-displacement pump 27 continuously pumps part of the sample at a constant volumetric rate through a second viscometer schematically indicated by 28. After passing through the viscometers the samples may be returned to the stream 20 or discarded. The input line to pump 21 contains a two-way valve 19 so that viscometer 22 may be supplied at the same rate with either sample or with a liquid 18 of known viscosity at 100° F. which is supplied from tank 17. The purpose of the liquid 18 of known viscosity will be explained later. The viscometer 22 comprises a constant-temperature bath maintained at 100° F. by means of a conventional thermostatically controlled electric heater (not shown). The sample from pump 21 first passes through a preheater coil 23 of sufficient length so that the sample attains substantially the bath temperature and then passes through a capillary tube 24 also in the thermostated bath. Due to the viscosity of the sample a pressure drop occurs across the capillary 24, and the differential pressure between the ends of the capillary 24 is detected by a conventional differential-pressure transducer 25 that converts the differential pressure into an electrical signal proportional thereto on leads 26. The electrical signal on leads 26 is thus proportional to the quantity U. This signal is representative of the point 11 of FIGURE 1. Similarly the viscometer 28 comprises a thermostated bath maintained at 210° F. in which the sample is passed through a preheater coil 29 and capillary 30, the differential pressure across the capillary 30 being detected by differential-pressure transducer 31 whose output is proportional thereto and is obtained as an electrical signal on leads 32. This signal is representative of point 12 of FIGURE 1. Thus the electrical signals on leads 26 and 32 represent the viscosity of the sample at 100° F. and at 210° F. respectively, and these signals are employed in a linear electrical analog computer to give an electrical indication of the V.I. of the sample.

In the viscometers 22 and 28 the differenial pressure transducers 25 and 31, more commonly called DP cells, may be of any conventional type that converts a hydraulic pressure difference across which it is connected to an electrical signal proportional thereto on its output leads. By way of example, the elements 25 and 31 may each be a Foxboro type 613 differential pressure transmitter manufactured by the Foxboro Company, Foxboro, Massachusetts, U.S.A., and described in their Technical Information Bulletin 39-15a. This device when connected electrically in series with 65 v. D.C. source and a 600 ohm load resistance acts effectively as a variable resistor whose resistance varies with the differential pressure so that the current in the circuit is a measure of the differential pressure. It is preferred that capillaries 24 and 30, as well as that the DP cells 25 and 31, be substantially identical in order that the respective electrical signals obtained have the same proportional relationship to viscosity in the viscometers 22 and 38.

Figure 3:
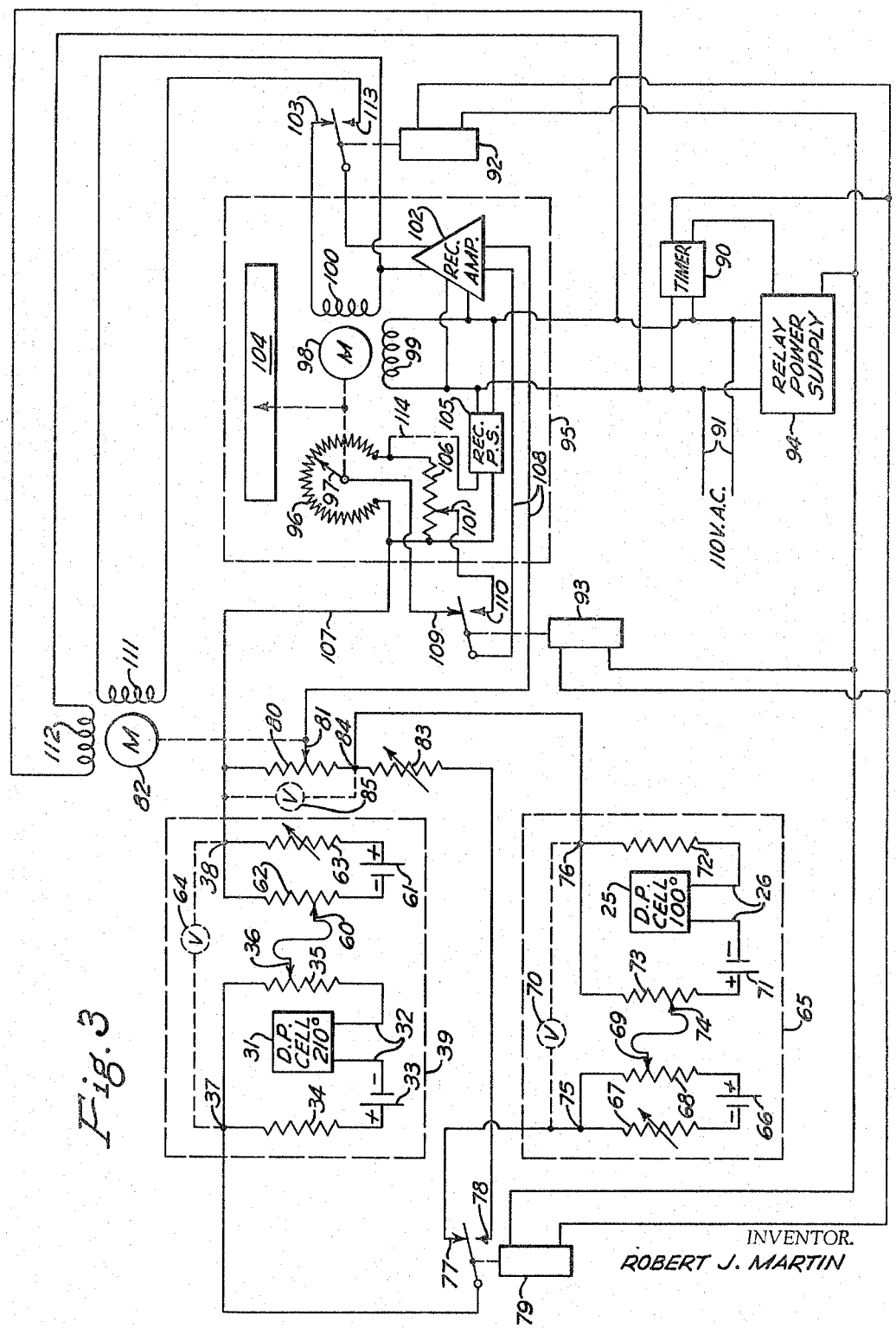
FIGURE 3 is a schematic wiring diagram of the electrical components employed in this invention.

FIGURE 3 shows a wiring diagram of a preferred type of linear electrical analog computer employed in this invention to combine the electrical signals respectively representing points 11 and 12 of FIGURE 2, with other electrical signals representing L and D in a manner to be explained so as to produce a signal proportional to the V.I. number of the sample.

In order to electrically simulate the definition of V.I. it is expedient to first set up in the analog computer a circuit having electric signals that represent the quantity $L-H$, which is equal to D. In the analog computer herein described the respective quantities will be simulated by voltages in the analog circuits, but it is to be understood that this is by way of example only and if desired, other electrical parameters may be employed to simulate the quantities involved in the computation. In FIGURE 3 the elements inside the dotted outline 39 form the $L-H$ (or D) circuit. Inasmuch as $L-H$ (or D) depends on the viscosity of the sample measured at 210° F., the $L-H$ circuit 39 contains the differential pressure transducer 31 of FIGURE 2. A 65 v. battery 33 is connected in series with the DP cell 31. The circuit is completed through series resistor 34 and potentiometer 35, the latter having an adjustable slider 36. The total resistance of elements 34 and 35 represents the load of the DP cell which is specified by the manufacturer to be 600 ohms±10 percent. The nature of the particular DP cell 31 employed herein by way of example is such that the current in the circuit comprising elements 31 to 36 is proportional to the differential pressure across the cell 31, which in turn is proportional to the viscosity of the sample flowing through the capillary 30 of viscometer 28 at 210° F. Accordingly, the voltage tapped off between junction 37 and slider 36 is proportional to the ordinate of point 12 (FIGURE 1).

Let us now examine the A.S.T.M. table showing how the quantity D (kinematic) varies with the viscosity of the oil in question, i.e. with the ordinate of point 12 (FIGURE 1). Inasmuch as the A.S.T.M. table is fixed there is fixed relationship between the value of D and the viscosity at 210° F. This relationship is illustrated as curve 41 in FIGURE 4. It is apparent that curve 41 has but slight curvature and accordingly over a limited range of viscosity values, for example between the viscosity limits 12 cs. to 17 cs., the curve 41 can be approximated with a good degree of accuracy by a straight line 42 that is drawn to be the best fit to curve 41 over the viscosity range of interest. The analytical equation representing the straight line 42 is of form $D=Y_0+C_1 \cdot (\text{vis. @ } 210°)$, where $Y_0$ is the intercept 43 on the D axis and $C_1$ is the slope ($\Delta D/\Delta$ vis. @ 210°) of the line 42. This straight line 42 is simulated by the circuit elements in the dotted outline 39 of FIGURE 3.

Figure 4:
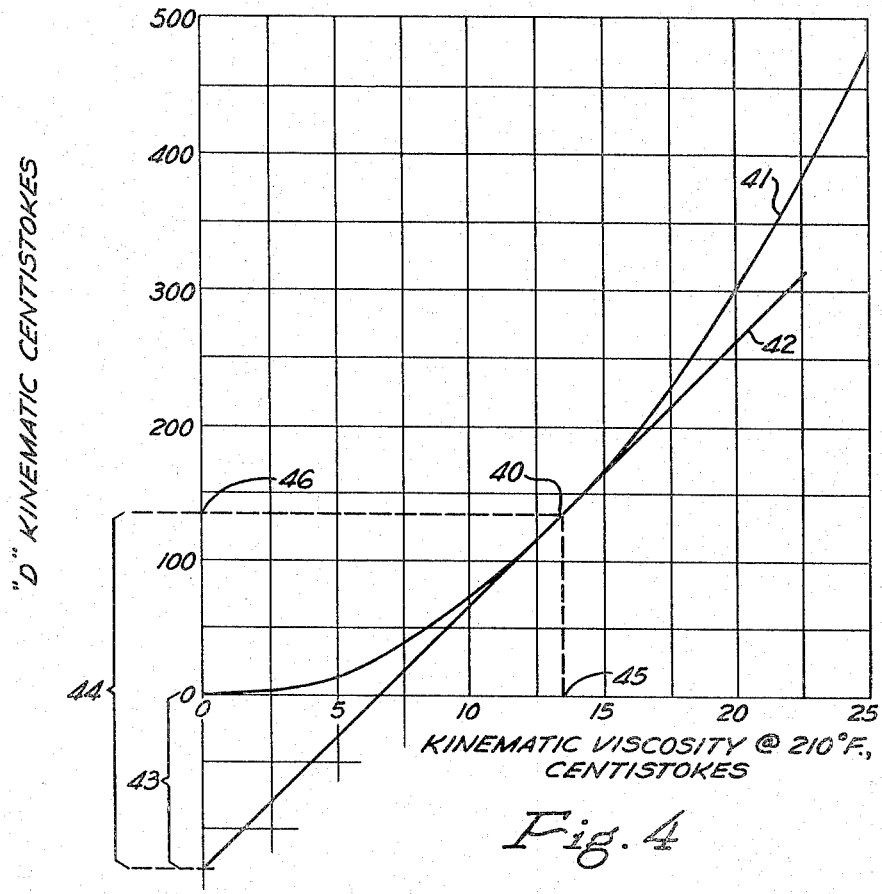
FIGURE 4 is a graph of A.S.T.M. values of the quantity D in the definition of V.I. plotted against observed kinematic viscosity at 210° F.

Referring to FIGURE 3 the current in the circuit of elements 31 to 35 is proportional to the quantity (vis. @ 210°) and the potential between junction 37 and slider 36 therefore represents the quantity $C_1 \cdot (\text{vis. @ } 210°)$ where the factor $C_1$ is adjusted by means of the position of slider 36. The intercept $Y_0$ of line 42 in FIGURE 4 is illustrated by 43 and is simulated in FIGURE 3 by the voltage tapped off of potentiometer 62 by slider 60, the potentiometer 62 being supplied with current from battery 61 connected as shown through adjustable resistor 63. Thus $Y_0$ is simulated by the voltage between junction point 38 and slider 60 of potentiometer 62. Because of the nature of the variation of D with (vis. @

210°) it is apparent that $Y_0$ will always be negative, hence the potential 60 to 38 is made opposite in polarity to the potential 37 to 36. Accordingly, the potential difference between junctions 37 and 38 will simulate the straight line 42 of FIGURE 4 when the sliders 36 and 60 are properly adjusted. Moreover, a straight line, such as 42, approximating any limited portion of curve 41 can be simulated with the network 39 by proper adjustment of elements 36, 60, and 63.

The following procedure is used to adjust the network 39 for operation over a particular limited range of vis. @ 210° values. For a vis. @ 210° value in about the middle of the desired range, the A.S.T.M. tables, i.e. curve 41, will indicate the value of D, as for example at point of FIGURE 4. The straight line 42 which approximates curve 41 at the point 40 will permit reading off the slope ($C_1 = \Delta D / \Delta$vis. @ 210°) of the straight line 42 and its zero-viscosity intercept $Y_0$ as shown in the graph FIGURE 4. In order that the network 39 simulates the line 42 it is necessary to first adjust the position of slider 36 to produce the proper value of slope $C_1$ and subsequently to adjust the position of slider 60 (and/or the value of resistor 63) to produce the proper value of intercept $Y_0$. These adjustments are preferably made by operating viscometer 28 with an oil whose vis. @ 210° is in about the middle of the range of interest, as for example, an oil represented by point 40. A high-resistance voltmeter 64 is temporarily connected between junctions 37 and 38 of network 39, and the difference in the reading of voltmeter 64 taken with the oil flowing through viscometer 28 and with oil of "zero viscosity" is observed. The "zero viscosity" condition is easily simulated by simply shutting down pump 27 (FIGURE 1) so that the DP cell 31 sees zero differential pressure. By adjusting slider 36 this voltage difference (determined by subtracting the two readings of voltmeter 64) is made to correspond to the interval 44 on the graph FIGURE 4. After slider 36 has been so adjusted, the resistor 63 and the position of slider 60 are adjusted so that the voltage with pump 27 shut down corresponds to the value 43 of interceptor $Y_0$. In making this adjustment the variable resistor 63 will permit a coarse adjustment to be made and slider 60 permits making a fine adjustment. It is, of course, convenient to use a simple proportionality between voltages and the respective analytical quantities so that the voltage in millivolts as read on voltmeter 64 connected across junctions 37 and 38 is proportional to the respective values of 43 and 44 in centistokes, and this proportionality must be noted as it is used again later. It is evident that after making the above-described adjustments the voltage across junctions 37 and 38 will represent the particular value of D in the definition of V.I. for an unknown sample passing through viscometer 28.

Figure 5:
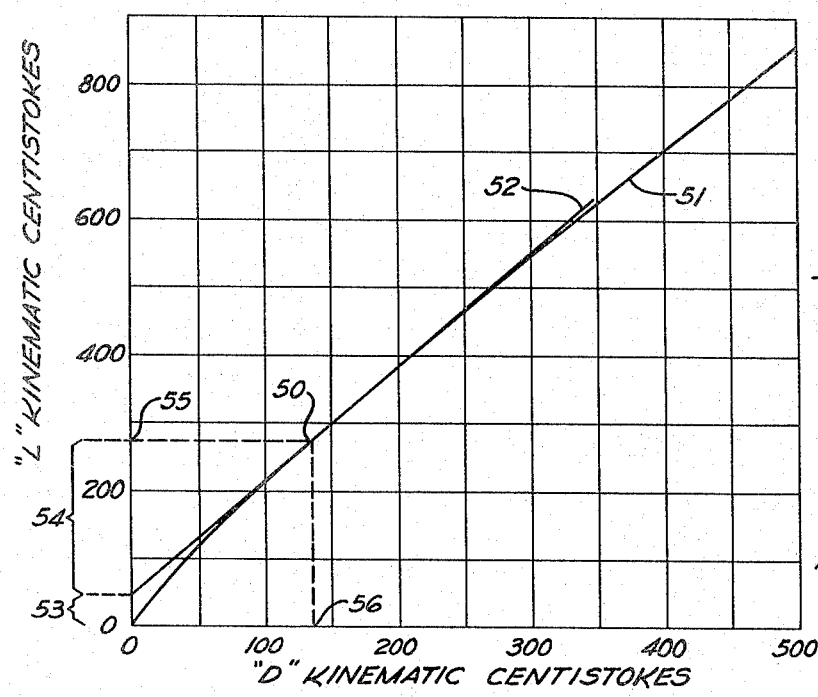
FIGURE 5 is a graph of A.S.T.M. values of the quantity L in the definition of V.I. plotted against values of the quantity D when kinematic viscosities are measured.

Further examination of the A.S.T.M. table shows that the quantity L (kinematic) varies with D (kinematic) in a prescribed manner, and this relationship is plotted as curve 51 in FIGURE 5. The curve 51 is seen to have but slight curvature and can, for any limited range of D values, be approximately by a straight line up to a good degree of accuracy over a limited range of D values of interest. The point 50 of FIGURE 5 corresponds to the point 40 of FIGURE 4 in that both points refer to the same D value that is near the middle of the range of interest. The algebraic equation representing the straight line 52 is of the form $L = Y_1 + C_2 \cdot D$ where $Y_1$ is the intercept 53 on the L axis, and $C_2$ is the slope $\Delta L / \Delta D$ of line 52. The straight line 52 is simulated by the further circuit elements 66–69 in the dotted outline 65 of FIGURE 3 when the relay 79 is de-energized as shown.

It is evident from the A.S.T.M. table that the slope of line 52 is always such that the coefficient $C_2$ is greater than unity. In order to simulate this it is convenient to divide the above equation for L through by $C_2$ so that it takes the form $L/C_2 = Y_1/C_2 + D$. Inasmuch as the potential between points 37 and 38 is proportional to D, this equation is easily simulated by adding to the potential 37–38 a potential proportional to $Y_1/C_2$. The quantities $Y_1$ and $C_2$ are determined from the line 52, and the voltage $Y_1/C_2$ is obtained from elements of a circuit 66–69 contained in the dotted outline 65. Battery 66 is connected in series with adjustable resistor 67 and potentiometer 68, the latter having a slider 69. The required voltage proportional to $Y_1/C_2$ is set up by adjustment of slider 69 in a manner to be described later.

The definition of V.I. contains the quantity $L - U$, so that it is necessary to subtract from the voltage simulating L an electrical voltage proportional to U. However, as mentioned above, the equation for L has been divided through by $C_2$, so that the voltage to be subtracted from voltage $L/C_2$ must simulate $U/C_2$. Accordingly, the circuit elements inside the dotted outline 65 must simulate the quantity $Y_1/C_2 - U/C_2$, using the same proportionality constant as was previously used in calibrating the circuit 39. The signal proportional to $U/C_2$ is simulated by the circuit elements 71–74 and DP cell 25 whose signal is obtained over leads 26. The DP cell 25 is powered by battery 71 and the load circuit comprises resistor 72 and potentiometer 73 having slider 74. The DP cell 25 is conveniently of the same type as the DP cell 31 inasmuch as the proportionality constant between electrical signal and viscosity as measured by the viscometers 22 and 28 of FIGURE 2 must be the same. The proportionality constant between $Y_1/C_2$ and $U/C_2$ and the respective voltages is the same as that previously employed in adjusting the elements of circuit 39.

The circuit 65 is calibrated by connecting a high resistance voltmeter 70 between the junctions 75 and 76. The value of the coefficient $C_2$ has already been determined from the slope $\Delta L / \Delta D$ of the line 52 of FIGURE 5. An oil 18 of known viscosity at 100° F. is now temporarily pumped through viscosity 22 of FIGURE 2 by turning valve 19 to connect pump 21 to a tank 17 of such known calibration oil 18. Since pump 21 is a constant-volume rate pump, the pumping rate will be unchanged. By means of voltmeter 70 the difference in the reading of voltmeter 70 taken with pump 21 circulating calibration oil through viscometer 22 and with the pump 21 shut down is observed, and this difference is made proportional to the known viscosity of the calibration oil divided by $C_2$ by adjustment of the slider 74. With the same voltmeter 70 connection (to junctions 75 and 76) and with pump 21 shut down the residual voltage is adjusted to be proportional to $Y_1/C_2$ by adjusting slider 69. Note that in making these adjustments the proportionality used is the same as that originally used in calibrating the elements of circuit 39. Having thus adjusted the elements of circuit 65, as well as previously adjusted the elements of circuit 39, it is evident that the potential 37–38 is proportional to D, and the potential 75–76 is proportional to $Y_1/C_2 - U/C_2$. Therefore, the potential 38–76 is proportional to $D + Y_1/C_2 + U/C_2$ when relay 79 is de-energized, i.e. in the position shown. The respective battery polarities are indicated in FIGURE 3 to take the various algebraic signs into proper consideration. In making the adjustments the voltmeter employed is, of course, connected to read the measured voltage on scale.

The contacts 77 and 78 of a relay 79 (shown in the de-energization position) are connected to the circuits 39 and 65 as shown in FIGURE 3. The circuit from junction 38 through circuit 39, contacts 77, through circuit 65 to junction 76, is connected to a potentiometer 80 having a slider 81 that is automatically adjusted by a servomotor 82 in a manner to be described later. Accordingly, when the relay 79 is not energized, the potential across potentiometer 80 is proportional to $$(Y_1/C_2 + D - U/C_2)$$

or $(L/C_2-U/C_2)$. When the relay 79 is energized, the circuit 65 is disconnected from the potentiometer 80, and the potential 37–38 is applied through contacts 78 across a voltage divider comprising adjustable resistor 83 and potentiometer 80. The potentiometer 80 and the voltage divider comprising elements 80 and 83 are of a high resistance compared to the resistance of circuits 39 and 65. Thus when relay 79 is energized, the potential across 80 and 93 is proportional to D. A high-resistance voltmeter 85 is temporarily connected across potentiometer 81, i.e. between the junctions 38 and 84, and with relay 79 energized the resistor 83 is adjusted so that the voltage 85 across potentiometer 80 is proportional to the voltage 37–38 (i.e. D) divided by the previously determined coefficient $C_2$. It is seen that upon making this adjustment the potential acros potentiometer 80 is made to simulate $D/C_2$.

Accordingly, when relay 79 is de-energized, the voltage across potentiometer 80 is $L/C-U/C_2$, and when relay 79 is energized, the voltage across potentiometer 80 is $D/C_2$. The quotient of these voltages simulates the definition of V.I., namely $$V.I. = (L/C_2 - U/C_2)/D/C_2 \times 100$$
$$= (L-U)/D \times 100$$

The factor of 100 is easily taken into account as a scale factor.

In order to simulate the division operation the slider 81 is adjusted so that the potential tapped off is unity voltage (scaled as 100) when the relay 79 is energized. Subsequently, with the slider 81 in the same position, the ratio of potential tapped off when relay 79 is de-energized is $(L-U)/1$, or is directly proportional to V.I. In a manner to be described later, the position of slider 81 is automatically adjusted when relay 79 is energized so that the voltage tapped off by slider 81 is unity and scaled on a recorder as 100, and when relay 79 is de-energized, the voltage tapped off is recorded. The relay 79 is periodically energized and de-energized by a timer which also controls associated relays in the recorder circuit.

Referring now to the right-hand portion of FIGURE 3, a timer 90 is energized by 110 v. A.C. house current obtained from leads 91. The timer 90 periodically energizes three relay coils 79, 92, and 93 through D.C. relay power supply 94. The function of relay 79 has already been explained. Relays 92 and 93 actuate contacts indicated in FIGURE 3 for the purpose of switching appropriate recorder circuits. The recorder employed is of the conventional potentiometric type and is diagrammatically indicated in part by elements inside the dotted outline 95. Only those parts of the recorder are indicated in 95 which are necessary to an understanding of the present invention and conventional elements of the recorder are not shown in the figure. Certain modifications are made in the recorder and these will be explained. Conventional potentiometric recorders are provided with a slide wire 96 whose contactor 97 is driven by a servomotor 98. The slide wire 96 is energized from the recorder working current power supply 105 through the dotted connection 114 representing other conventional recorder elements that are not part of the present invention. The srvomotor 98 is conventionally of the two-phase type having fixed-phase coil 99 and variable-phase coil 100. The fixed-phase coil 99 is energized from the 110 v. A.C. supply. The variable-phase coil 100 is supplied by output voltage from the recorder amplifier 102 through relay contacts 103 actuated by relay coil 92 shown in the de-energized position. The position of the slider 97 is indicated on the recorder scale 104 in conventional manner. The power supply 105 and the amplifier 102 are supplied with 110 v. A.C. power obtained from leads 91. A potentiometer 106 is connected in parallel with the recorder slide wire 96 and conveniently replaces the shunt-connected standardizing resistor conventionally found in commercial recorders. The slider 101 of potentiometer 106 is adjusted so that the potential tapped off between lead 107 and slider 101 is unity voltage, as for example 1 millivolt. When the relays 79, 92, and 93 are de-energized, the output of the recorder amplifier 102 is such as to drive the servomotor 98 in such direction that the input to the recorder amplifier 102 as obtained from leads 108 is a minimum. The recorder slider 97 is connected through contact 109 of relay 93 to the input of amplifier 102 and the slider 81 of the potentiometer 80. Under this condition the potential drop tapped off by slider 97 on the slide wire 96 balances the potential drop from junction 38 to 81 on the potentiometer 80. It is seen that the recorder 104 therefore records that portion of the potential between junctions 38 and 76 tapped off by the slider 81.

Timer 90 periodically energizes relays 79, 92, and 93. When relay 93 is energized, the input of recorder amplifier 102 is connected through contact 110 of relay 93 so that the potential drop between junction 38 and slider 81 of potentiometer 80 is balanced against unity potential drop tapped off by slider 101 of potentiometer 106. Output of the amplifier 102 is now connected via contact 113 of relay 92 to the variable-phase coil 111 of servomotor 82, and the fixed-phase coil 112 of servomotor 82 is supplied with 110 v. A.C. power from leads 91. The phasing of the coils 111 and 112 is such that servomotor 82 is driven in a direction to minimize the input to the recorder amplifier 102. The servomotor 82 therefore drives the slider 81 until the voltage balance is obtained. This balance is performed with relay 79 energized so that the potential 37–38 is supplied through relay contact 78 to resistor 83 and potentiometer 80 in series as previously explained. This automatically balances the voltage 38 to 81 against the unity voltage from 107 to 101. Therefore, whenever the timer 90 energizes relays 79, 92, and 93, the slider 81 is automatically adjusted by servomotor 82 so that the potential between junction 38 and 81 is unity. On the other hand when relays 79, 92, and 93 are de-energized, the servomotor 82 does not function and the slider 97 on the recorder slide wire is adjusted by servomotor 98 to measure and record the potential between junctions 38 and 81. In order to maintain continuity of recording, the timer is set to energize relays 79, 92, and 93 for only a relatively small fraction of the time cycle. By way of example, the timer may be set to energize relays 79, 92, and 93 for a period of ten seconds every minute.

When relay 79 is energized and servomotor 82 adjusts slider 81 so that the potential between 38 and 81 is unity, the slider 81 is then in a position to make the denominator of the defining equation for V.I. equal to unity. Subsequently, when the relays 79, 92, and 93 are de-energized, the potential tapped off between junction 38 and slider 81 will simulate the numerator of the defining equation for V.I. and this voltage will be measured on the slide wire 96 and recorded by the recorder.

It is apparent that the unit voltage tapped off potentiometer 106 by slider 101 may have any assigned fixed value, but it is convenient to make the unit voltage such that slider 81 balances it somewhere in the upper part of its range, and also so that the indicator 104 of the recorder reads 100 for this unit voltage on a scale that extends beyond 100 in order that oils whose V.I. exceeds 100 can be accommodated.

While elements 33, 61, 66, and 71 are indicated as batteries, it is apparent that these may be conventional D.C. power supplies that derive energy from the 110 v. A.C. supply. However, precautions must be taken to properly isolate the D.C. circuits of such power supplies from each other and from accidental grounds that may upset the analog circuits.

In adjusting the circuit 39 it is important to adjust the slider 36 first as explained above for the reason that the DP cell 31 may be of a type that has a "live" zero, i.e. has a zero-differential-pressure current that is not zero. The subsequent adjustment of slider 60 as described will then automatically compensate the circuit for the effect of any such live zero in the DP cell 31. Similarly in the circuit 65 the slider 74 is adjusted first and subsequent adjustment of slider 69 as described will compensate for any live zero in DP cell 25.

In the foregoing discussion reference has been made to viscosity and the related values of L and D are kinematic viscosity values. The A.S.T.M. tables also list values for Saybolt Universal viscosity measurements and these would, of course, be employed in plotting the curves of FIGURES 4 and 5 in the event that the viscometers 22 and 38 employed measure the Saybolt Universal viscosity. The viscometers 22 and 28 illustrated in FIGURE 2 produce an output signal that represents absolute viscosity which is related to kinematic viscosity (i.e. kin. vis.=abs. vis./density). However, since the density of liquids varies but slightly with temperature as compared with the variation in viscosity, the use of absolute viscosity viscometers is sufficiently accurate for all practical purposes. It is apparent that if greater precision is desired, the viscometers 22 and 28 may comprise well-known devices for accurately measuring kinematic viscosity.

By way of example only, and not by way of limitation, the various elements forming components of the circuits of this invention may have the following specifications:

| Element | Component | Specification |
| --- | --- | --- |
| 34, 72 | Resistor | 600 ohm. |
| 35 | Potentiometer | 50 ohm, 10 turn. |
| 62, 68 | ___do___ | 100 ohm, 10 turn. |
| 63, 67 | Variable resistor | 5,000 ohm, 10 turn. |
| 80 | Potentiometer | 1,000 ohm, 10 turn. |
| 83 | Variable resistor | 5,000 ohm, 10 turn. |
| 73 | Potentiometer | 1.15 ohm, 10 turn. |
| 92 | Relay | Potter Brumfield type KRP 14D. |
| 79, 93 | ___do___ | Clare Hg 1002. |
| 95 | Recorder | Brown "Electronik." |
| 106 | Potentiometer | 50 ohm, 10 turn. |
| 82 | Servomotor | Same as in Brown recorder. |
| 90 | Timer | Industrial Timer Corp. recycling timer. |
| 33, 71 | Power supply | Technipower model M68.0 D.C. power supply. |
| 61, 66 | ___do___ | Technipower model M21.2 D.C. power supply. |
| 25, 31 | DP cell | Foxboro type 613. |

Figure 6:
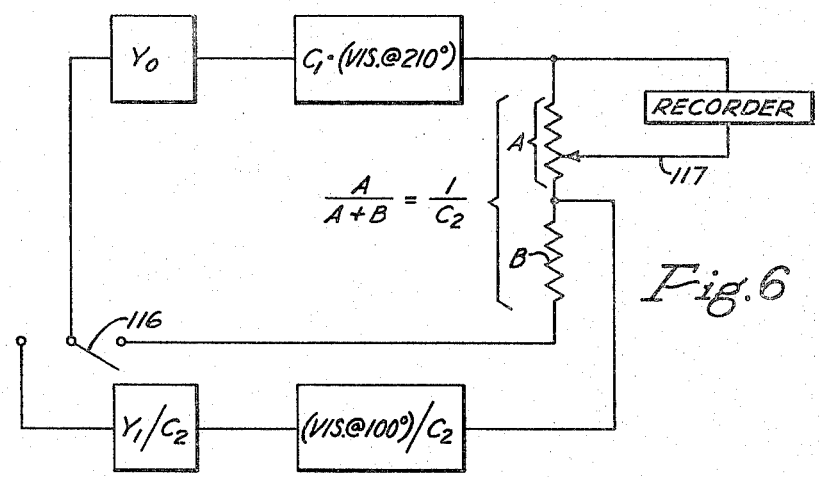
FIGURE 6 is a summary schematic diagram of the electrical analog computer employed in the circuit of FIGURE 3.

While one type of linear computer is herein described, it will be apparent to those skilled in the art that other types of linear computers may alternatively be employed. FIGURE 6 is a summary diagram of the computer already described in which the quantity $Y_0$ is simulated by elements 60 to 63 of FIGURE 3, quantity $C_1 \cdot$(Vis. @ 210°) is simulated by elements 31 to 34 of FIGURE 3, the quantity $Y_1/C_2$ is simulated by elements 66 to 69 of FIGURE 3, and the quantity (Vis. @ 100°)/$C_2$ is simulated by elements 25, 26, 71–74 of FIGURE 3. In FIGURE 6 the relay 79 is merely schematically indicated by switch 116. The slider 117 is automatically adjusted to unity voltage when switch 116 is in the right-hand position.

Figure 7:
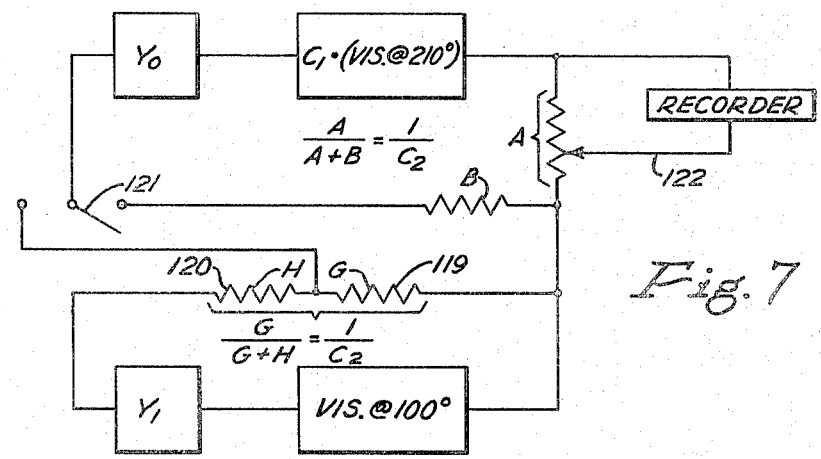
FIGURE 7 is a summary schematic diagram of an alternative electrical analog computer that may be employed in this invention.

FIGURE 7 shows a summary diagram of an alternative computer in which the quantities $Y_0$ and $C_1 \cdot$(Vis. @ 210°) are simulated by the same elements of FIGURE 3 as in FIGURE 6. The quantity $Y_1$ is simulated by elements similar to elements 66–69 of FIGURE 3, but these elements will now have different values. The quantity (Vis. @ 100°) is simulated by elements similar to elements 25, 26, 71–74 of FIGURE 3, but having different values. It is evident that the respective elements will have values differing from those of FIGURE 3 because they represent different quantities. In FIGURE 7 a voltage divider comprising resistors 119 and 120 is connected as shown and the resistors have the resistance ratio indicated on FIGURE 7. The switching relay is represented by switch 121, and the slider 122 is adjusted to unity voltage when switch 121 is in the right-hand position.

Figure 8:
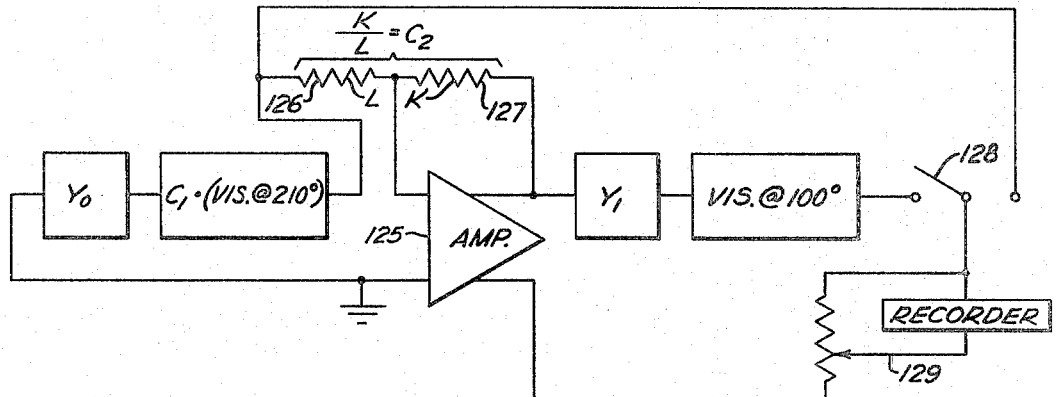
FIGURE 8 is a summary schematic diagram of a further alternative electrical analog computer that may be employed in this invention.

FIGURE 8 shows a summary diagram of a further computer embodiment in which an operational amplifier 125 is employed. The amplifier 125 may, for example, be a type PP65 made by Philbrick Researches, Inc., Boston, Massachusetts, U.S.A. The input circuit of amplifier 125 comprises a $Y_0$ circuit and a $C_1 \cdot$(Vis. @ 210°) circuit similar to the corresponding elements in FIGURES 3, 6, and 7. Input voltage to the amplifier is through a resistor 126 of resistance L which is high compared to the internal resistances of the $Y_0$ and $C_1 \cdot$(Vis. @ 210°) circuits. The output circuit of amplifier 125 comprises a $Y_1$ circuit and a (Vis. @ 100°) circuit similar to the corresponding elements of FIGURE 7. A feedback resistor 127 is connected as shown, and the ratio of the resistances 126 and 127 is as indicated in FIGURE 8. In such a circuit the output voltage of amplifier 125 is $K/L$ times its input voltage. The switching relay is represented by switch 128, and the slider 129 is adjusted to unity voltage with switch 128 in the right-hand position.

The function of voltmeters 64, 70, and 85 temporarily connected as shown in FIGURE 3 may, of course, be accomplished by a single meter appropriately connected in each instance. It will further be evident to those skilled in the art that the recorder 95 may itself be temporarily appropriately connected as a voltmeter to perform these voltage-measuring functions in originally setting up the circuits of FIGURE 3.

It is apparent that the contacts of relays 79 and 93 are in circuits of critical resistance and therefore it is preferred that these relays have low-resistance contacts and may, for example, be mercury relays. It is further evident that the respective relays 79, 92, and 93 may be provided with slight time delays in a manner well known in the art in order to avoid a spurious kick of the recorder at the moment of switching, and particularly to avoid any disturbance of the adjustment of slider 81 at the end of its adjustment period. Upon energization of the relays 79, 92, and 93, the relay 92 should pull up first, then 79, and then 93. Upon de-energization of the relays the relay 92 should release first, then 79, and then 93. Additional relay control circuits (not shown) may be employed if desired in order to insure proper sequence of operation of relays 79, 92, and 93 as is well known in the art.

While for purposes of explanation only one straight line 42 and 52 is shown in FIGURES 4 and 5 respectively, any part of the curves 41 and 51 of these figures can be approximated by other straight lines similar to 42 and 52 and which fit the respective curve with acceptable precision over any limited range of viscosity values. It is apparent that over the desired range the best-fitting straight line may be computed from the A.S.T.M. tabulated values by the well-known method of least squares. Such a least-square computation will also indicate the maximum error in the approximation, and this error may in any case be reduced to an acceptable value by narrowing the viscosity range over which the particular straight line is used.

It is thus evident that after adjusting the parameters of the analog electric circuits as described, and flowing through the viscometers a sample of oil whose viscosity at 210° F. is in the viscosity range to which the circuits are adjusted, the recorder will indicate and record on its scale 104 the V.I. of the samples. While in the foregoing description of the invention the respective resistors 63, 67, and 83, as well as the sliders 36, 60, 69, and 74 are indicated as adjusted each time the viscosity range of interest is changed, it will readily be apparent that these elements may be calibrated and fixed taps taken at the appropriate points, which taps may also be connected to respective members of a gang switch (not shown) so that the entire apparatus can be quickly switched to accommodate any desired viscosity range of interest provided only that the flow rate of pumps 21 and 27, viscometer capillaries 24 and 30, and DP cells 25 and 31 remain unchanged. Further extension of the viscosity range that can be accommodated may be made by changing the flow rate, dimensions of the capillaries, and/or characteristics of the DP cells in appropriate well-known manner.

What I claim as my invention is:

1. Apparatus adapted to indicate the A.S.T.M. viscosity index of a fluid which comprises
   a first viscometer producing a first electrical signal proportional to the viscosity of the fluid at 100° F. and simulating the quantity U in the A.S.T.M. definition of viscosity index,
   a second viscometer producing a second electrical signal proportional to the viscosity of the fluid at 210° F.,
   an electric analog computer connected to both said viscometers simulating the approximate linear relationship between the respective quantities D and L in the A.S.T.M. definition of viscosity index and said second electrical signal over a viscosity range of interest, said electric analog computer producing electrical signals respectively proportional to said quantities D and $L-U$ and
   electrical measuring means connected to said electric analog computer and adapted to measure the ratio of said electrical signals respectively simulating $L-U$ and D.

2. Apparatus adapted to indicate the A.S.T.M. viscosity index of a fluid which comprises
   a first viscometer producing a first electrical signal proportional to the viscosity of the fluid at 100° F. and simulating the quantity U in the A.S.T.M. definition of viscosity index,
   a second viscometer producing a second electrical signal proportional to the viscosity of the fluid at 210° F.,
   an electric analog computer connected to said second viscometer simulating the approximate linear relationship between the respective quantities D and L in the A.S.T.M. definition of viscosity index and said second electrical signal over a viscosity range of interest, said electric analog computer producing electrical signals respectively simulating said quantities D and L,
   an electric circuit including said first viscometer and said electric analog computer producing an electrical signal simulating $L-U$, and
   electrical measuring means connected to said electric circuit and to said electric analog computer and adapted to measure the ratio of said electrical signals respectively simulating $L-U$ and D.

3. Apparatus adapted to indicate the A.S.T.M. viscosity index of a fluid which comprises
   a first viscometer producing a first electrical signal in proportion to the viscosity of the fluid at 100° F. and simulating the quantity U in the A.S.T.M. definition of viscosity index,
   a second viscometer producing a second electrical signal in proportion to the viscosity of the fluid at 210° F.,
   a first linear electric circuit having parameters that simulate an approximate linear relationship between the quantity D in the A.S.T.M. definition of viscosity index and said second electrical signal over a viscosity range of interest, said first electric circuit producing an electrical signal simulating the quantity D,
   a second linear electric circuit having parameters that simulate an approximate linear relationship between the quantities D and L in the A.S.T.M. definition of viscosity index over values thereof of interest,
   a third linear electric circuit including said first electric circuit and said second electric circuit and said first electrical signal, said third electric circuit producing an electrical signal that simulates the quantity $L-U$, and
   electrical measuring means selectively connected to said third electrical circuit and to said first electric circuit and adapted to measure the ratio of said electrical signal simulating the quantity $L-U$ to said electrical signal simulating the quantity D.

4. Apparatus adapted to indicate the A.S.T.M. viscosity index of a fluid which comprises
   a first viscometer producing a first electrical signal in proportion to the viscosity of the fluid at 100° F. and simulating the quantity U in the A.S.T.M. definition of viscosity index,
   a second viscometer producing a second electrical signal in proportion to the viscosity of the fluid at 210° F.,
   means connected to said viscometers flowing the fluid therethrough,
   a first linear electric circuit having parameters that simulate an approximate linear relationship between the quantity D in the A.S.T.M. definition of viscosity index and said second electrical signal over a viscosity range of interest, said first electric circuit producing an electrical signal that simulates the quantity D,
   a second linear electric circuit having parameters that simulate an approximate linear relationship between the quantities D and L in the A.S.T.M. definition of viscosity index over values thereof of interest,
   a thihrd linear electric circuit including said first electric circuit and said second electric circuit and said first electrical signal, said third electric circuit producing an electrical signal that simulates the quantity $L-U$,
   electrical-measuring means,
   means adapted to selectively connect said electrical-measuring means to said first electric circuit whereby to measure the electrical signal that simulates the quantity D and to connect said electrical-measuring means to said third electric circuit whereby to measure the electrical signal that simulates the quantity $L-U$, and
   means adapted to measure the ratio of said electrical signals simulating the quantities $L-U$ and D.

5. Apparatus adapted to indicate the A.S.T.M. viscosity index of a fluid which comprises
   a first viscometer producing a first electrical signal in proportion to the viscosity of the fluid at 100° F. and simulating the quantity U in the A.S.T.M. definition of viscosity index,
   a second viscometer producing a second electrical signal in proportion to the viscosity of the fluid at 210° F.,
   means connected to said viscometers flowing the fluid therethrough,
   a first linear electric circuit having parameters that simulate an approximate linear relationship between the quantity D in the A.S.T.M. definition of viscosity index and said second electrical signal over a viscosity range of interest, said first electric circuit producing a voltage that simulates the quantity D,
   a second linear electric circuit having parameters that simulate an approximate linear relationship between the quantities D and L in the A.S.T.M. definition of viscosity index over values thereof of interest,
   a third linear electric circuit including said first electric circuit and said second electric circuit and said first electrical signal, said third electric circuit producing a voltage that simulates the quantity $L-U$,
   a resistor of relatively high resistance,
   means adapted to selectively connect said resistor to said first electric circuit whereby to apply to said resistor a voltage that simulates the quantity D and to connect said resistor to said third electric circuit whereby to apply to said resistor a voltage that simulates the quantity $L-U$, and
   electrical measuring means adapted to measure the ratio of said resistor voltages.

6. Apparatus adapted to indicate the A.S.T.M. viscosity index of a fluid which comprises
- a first viscometer producing a first electrical signal in proportion to the viscosity of the fluid at 100° F. and simulating the quantity U in the A.S.T.M. definition of viscosity index,
- a second viscometer producing a second electrical signal in proportion to the viscosity of the fluid at 210° F.,
- means connected to said viscometers flowing the fluid therethrough,
- a first linear electric circuit having parameters that simulate an approximate linear relationship between the quantity D in the A.S.T.M. definition of viscosity index and said second electrical signal over a viscosity range of interest, said first electric circuit producing a voltage that simulates the quantity D,
- a second linear electric circuit having parameters that simulate an approximate linear relationship between the quantities D and L in the A.S.T.M. definition of viscosity index over values thereof of interest,
- a third linear electric circuit including said first electric circuit and said second electric circuit and said first electrical signal, said third electric circuit producing a voltage that simulates the quantity $L-U$,
- a potentiometer having a slider,
- means adapted to selectively connect said potentiometer to said first electric circuit whereby to apply to said potentiometer a voltage that simulates the quantity D and to connect said potentiometer to said third electric circuit whereby to apply to said potentiometer a voltage that simulates the quantity $L-U$,
- means connected to said slider adapted to adjust said slider to a unit-voltage position when said potentiometer is connected to said first electric circuit, and
- means connected to said slider adapted to measure the voltage thereof when said potentiometer is connected to said third electric circuit.

7. Apparatus adapted to indicate the A.S.T.M. viscosity index of a fluid which comprises
- a first viscometer producing a first electrical signal in proportion to the viscosity of the fluid at 100° F. and simulating the quantity U in the A.S.T.M. definition of viscosity index,
- a second viscometer producing a second electrical signal in proportion to the viscosity of the fluid at 210° F.,
- means connected to said viscometers flowing the fluid therethrough,
- a first linear electric circuit having parameters that simulate an approximate linear relationship between the quantity D in the A.S.T.M. definition of viscosity index and said second electrical signal over a viscosity range of interest, said first electric circuit producing a voltage that simulates the quantity D,
- a second linear electric circuit having parameters that simulate an approximate linear relationship between the quantities D and L in the A.S.T.M. definition of viscosity index over values thereof of interest,
- a third linear electric circuit including said first electric circuit and said second electric circuit and said first electrical signal, said third electric circuit producing a voltage that simulates the quantity $L-U$,
- a potentiometer having a slider,
- means adapted to alternately connect said potentiometer to said first electric circuit whereby to apply to said potentiometer a voltage that simulates the quantity D and to connect said potentiometer to said third electric circuit whereby to apply to said potentiometer a voltage that simulates the quantity $L-U$,
- a recorder including a slide wire,
- a source of unit voltage,
- a servomotor mechanically connected to adjust the position of said slider, and
- servocontrol means electrically connected to said slider and adapted to alternately actuate said servomotor and said recorder, said servocontrol being adapted to adjust said slider to a position such that the potential between said slider and said source of unit voltage is a minimum when said potentiometer is connected to said first electric circuit and to adjust said recorder slide wire to a position such that the potential between said slider and said recorder slide wire is a minimum when said potentiometer is connected to said third electric circuit.

References Cited by the Examiner

UNITED STATES PATENTS

| | | | |
|---|---|---|---|
| 2,165,182 | 7/1939 | Luhrs | 235—151.34 |
| 3,116,630 | 1/1964 | Piros | 73—55 |

DAVID SCHONBERG, *Primary Examiner.*